United States Patent [19]

Cheng

[11] Patent Number: 4,899,537
[45] Date of Patent: Feb. 13, 1990

[54] STEAM-INJECTED FREE-TURBINE-TYPE GAS TURBINE

[75] Inventor: Dah Yu Cheng, Los Altos Hills, Calif.

[73] Assignee: International Power Technology, Inc., Redwood City, Calif.

[21] Appl. No.: 577,899

[22] Filed: Feb. 7, 1984

[51] Int. Cl.$^4$ .............................................. F02C 3/10
[52] U.S. Cl. .................................. 60/39.161; 60/39.55
[58] Field of Search ............... 60/39.04, 39.05, 39.161, 60/39.182, 39.55, 39.163

[56] References Cited

U.S. PATENT DOCUMENTS

| | | | |
|---|---|---|---|
| 3,359,723 | 12/1967 | Bohensky et al. | 60/39.05 |
| 3,368,347 | 2/1968 | Wickman | 60/39.161 |
| 3,521,448 | 7/1970 | Amelio | 60/39.161 |
| 3,693,347 | 9/1972 | Kydd et al. | 60/39.55 |

FOREIGN PATENT DOCUMENTS 961514  6/1964  United Kingdom ............. 60/39.161

OTHER PUBLICATIONS

Strimbeck et al. "Coal-Burning Turbine with Water Injection can Increase Peaking Power" in *Power Engineering* Feb., 1965, p. 43.

Primary Examiner—Louis J. Casaregola

[57] ABSTRACT

A steam-injected free-turbine type of gas turbine is disclosed. In order to avoid the necessity of redesigning the compressor/core turbine, the shaft of the core turbine is modified to provide additional load output. As steam is injected into the system the resulting excess power of the core turbine is taken out of the system by coupling the compressor output shaft with a load. Thus, the core turbine operates as a single shaft turbine in addition to the existing power turbine. A control provides control of the load output of the two turbine output shafts so that the compressor/turbine stays in the matched operating domain.

4 Claims, 4 Drawing Sheets

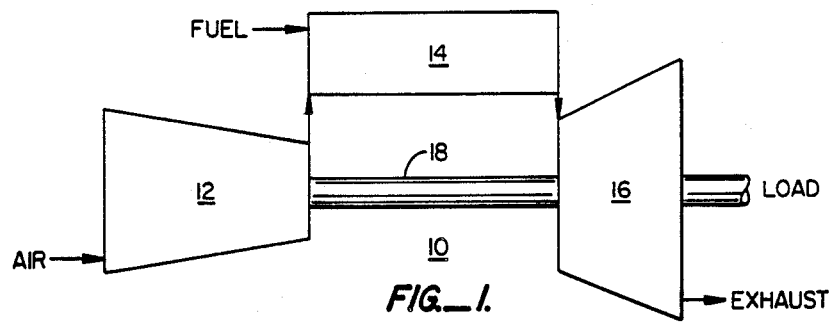
FIG._1.
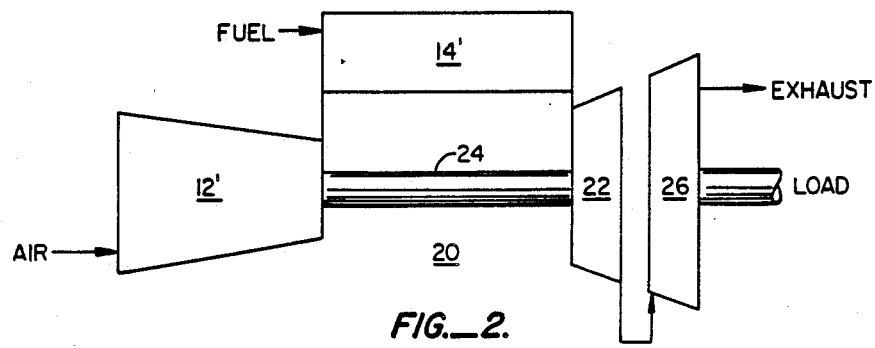
FIG._2.
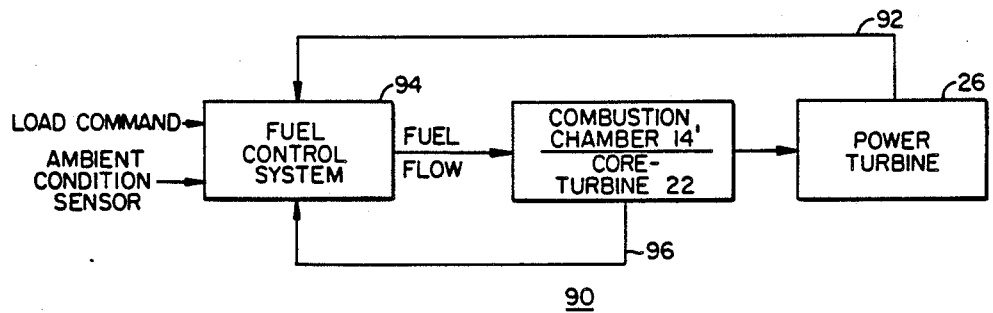
FIG._4.

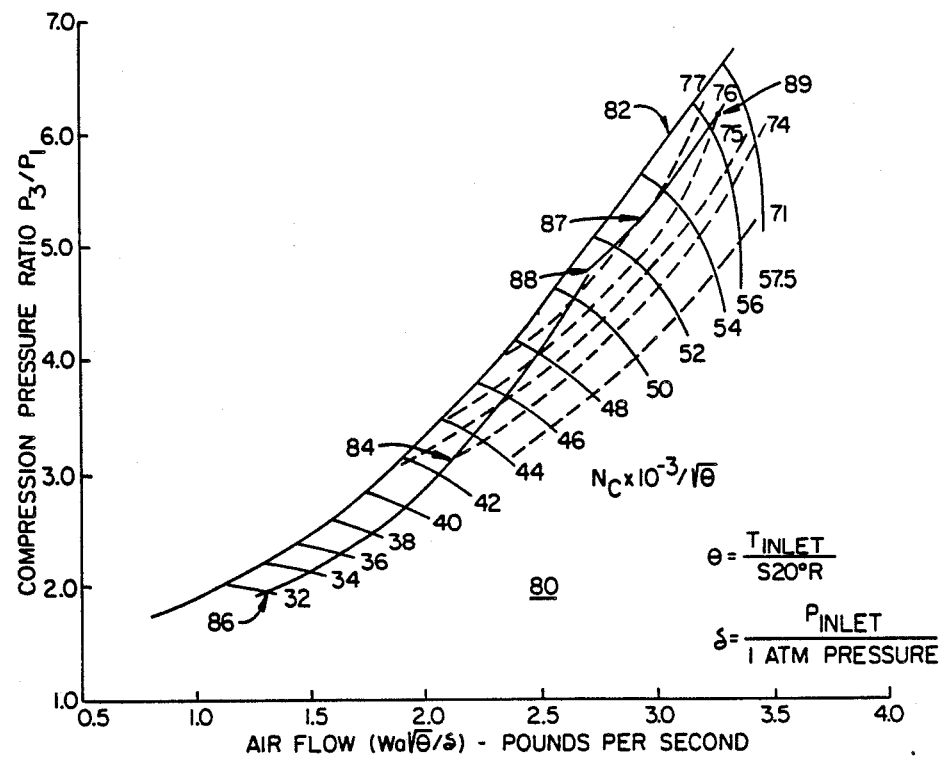
FIG._3.
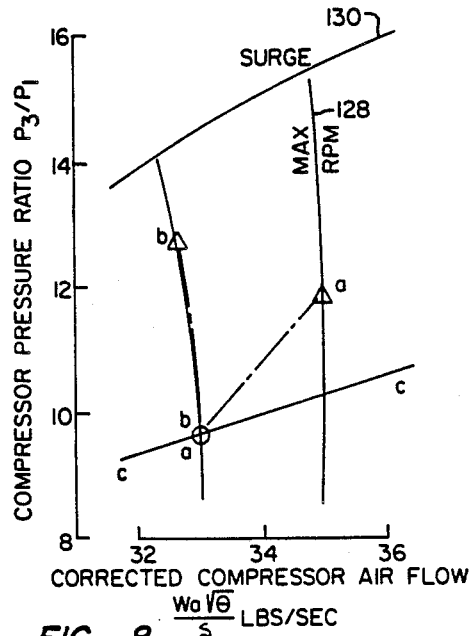
FIG._8.

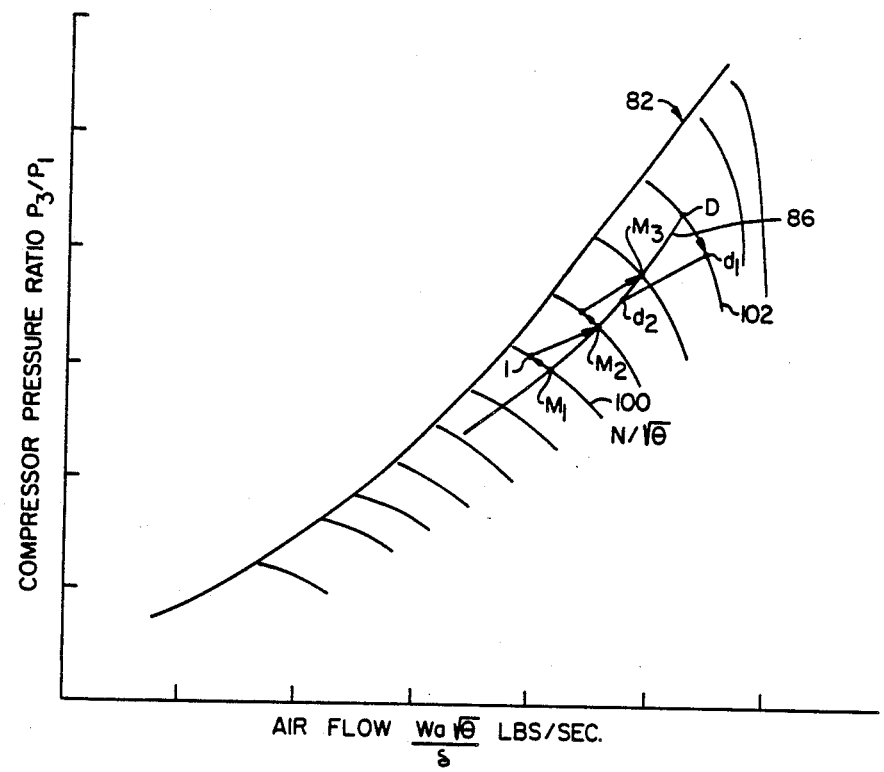
FIG._5.
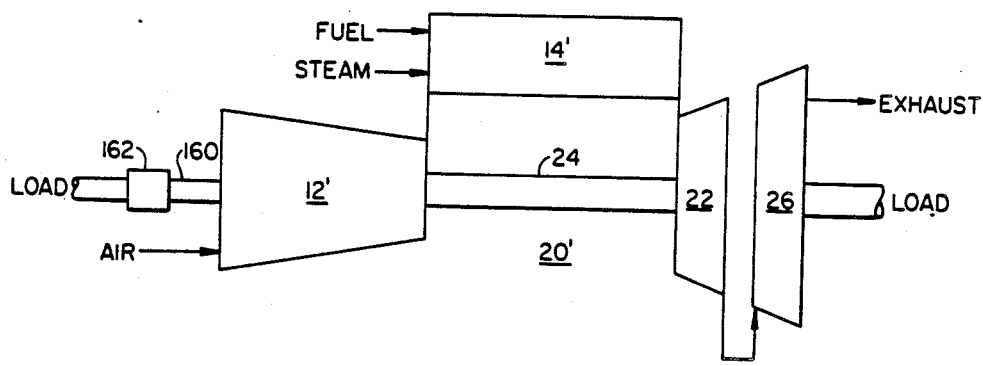
FIG._6.

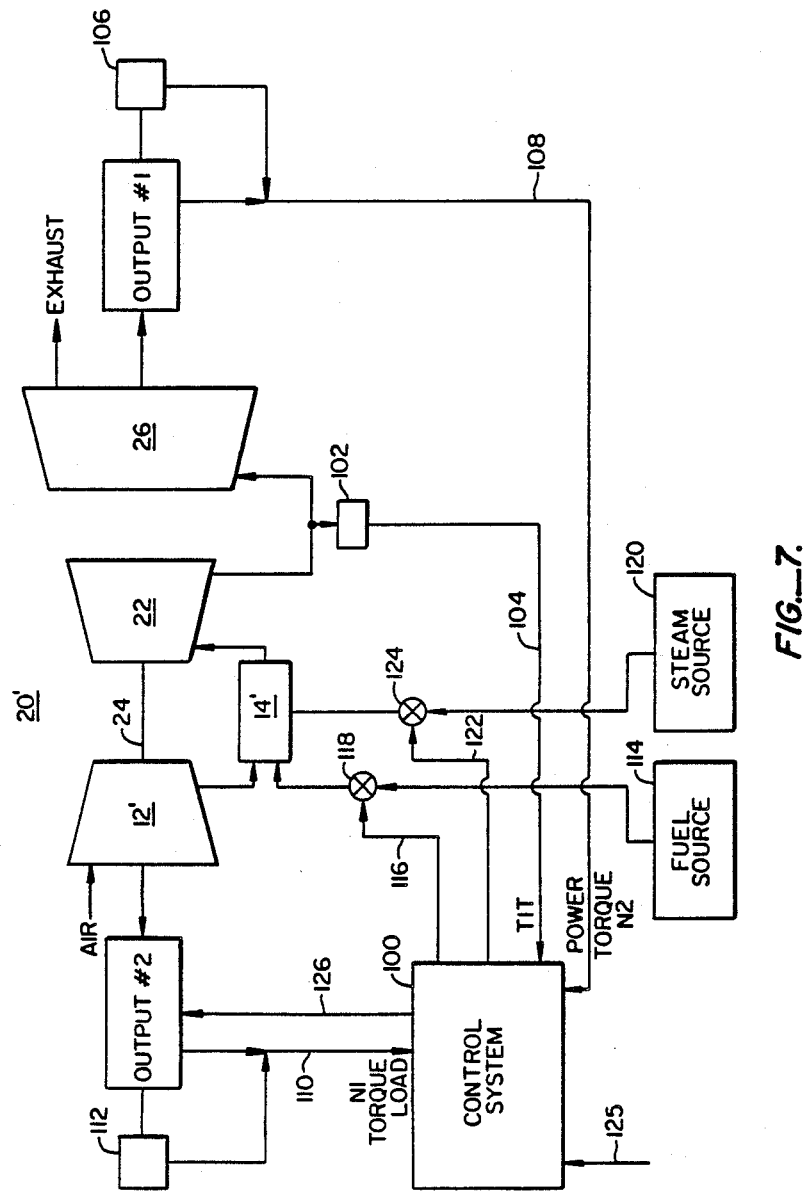
FIG._7.

# STEAM-INJECTED FREE-TURBINE-TYPE GAS TURBINE

DESCRIPTION

1. Technical Field

This invention relates to steam injected gas turbine engines of the type having a free or power turbine, and in particular to steam injection into a Cheng cycle engine having a free turbine.

2. Background Art

A variety of steam injection gas turbine engine systems exist in the prior art. The high efficiency potential of the Cheng, or Cheng Dual Fluid Cycle engine, as described in U.S. Pat. Nos. 4,128,994 and 4,248,039, is realized when a specific amounts of steam is injected into a gas turbine to maximize both the power output and/or the thermal efficiency. The steam is obtained by recovery of the turbine exhaust waste heat. Highest efficiency is obtained at the highest practical steam thermo-dynamic potential.

Gas turbines can be divided into two categories; namely, the single shaft and the so-called free or power turbine versions. A single shaft turbine comprises a compressor, a combustion chamber and a turbine where the compressor and the turbine are linked by a mechanical shaft as an integral unit. If minor losses are neglected, the excess power, after supplying the compressor's need, becomes the net shaft output. In such a gas turbine, roughly two-thirds of the turbine power output is consumed in supplying the work requirement of the compressor. The mechanical coupling of the single shaft design resolves the problem of the power split between the output power and the compressor needs. This also resolves the problem of power redistribution due to steam injection into the engine. Very often, the single shaft gas turbine is operated at a fixed rpm regardless of the load demand. In this case, fuel flow varies with the turbine inlet temperature and hence, the power output.

In a free turbine type of gas turbine, the compressor is linked to the core or gas generation turbine with a separate turbine section, often called the free or power turbine, to produce power output. One advantage of this configuration is that it allows the free turbine, which supplies power to the load, to operate at rotational speeds different from the core turbine/compressor/rotor system. In this case, the core turbine provides essentially all the power requirements for the compressor. This requirement forces the compressor/core turbine to be matched in power balance such that the unit must follow a fairly narrow prescribed operating path. This path is defined by the need to match, within certain boundaries, the compressor and the core turbine performance characteristics. With turbines and compressors as drive and driven components respectively, the match is not maintained at certain rotational speeds, mass flow, and pressure conditions. To have wider matching possibilities variable guide vanes or gas release valves are commonly installed in the compressor, which can temporarily cause a more nearly matched condition under starting and low rotational speed conditions.

If steam is to be injected into such a turbine engine, the addition cannot be made arbitrarily. If a free turbine engine is to be retrofitted, for example, to use the Cheng cycle, injecting the total amount of steam produced by the exhaust waste heat into the combustion chamber will result in the power output of the core turbine increasing far beyond what the compressor can absorb at the matched condition. This is because the power required for the compressor remains essentially constant and there is no convenient way to transfer the excess core turbine output from the core turbine to the power or free turbine without a complicated mechanical system, or completely redesigning the core turbine.

DISCLOSURE OF THE INVENTION

It is therefore an object of the invention to provide an improved steam injected gas turbine of the free-turbine design.

Another object of the invention is to provide an improved steam-injected Cheng cycle engine of the free-turbine design;

Another object of the invention is to provide steam injection in a free-turbine type of gas turbine or Cheng cycle engine that requires a minimum of design modification of the core and power turbine sections.

In accordance with the present invention, a power output shaft is selectively coupled to the core turbine compressor. Excess power developed by the core turbine due to the addition of steam to the engine is, in this manner, used to create useful output power. At the same time it prevents a compressor/core mismatch which would otherwise occur.

The operating characteristics of a free-turbine engine design must be defined in terms of a complicated thermo-dynamic feedback link and the component matching. Without major turbine modifications, if steam were injected in large quantities into the combustion chamber of a free turbine type of gas turbine engine, as in the case of a single shaft gas turbine, it would grossly upset its matching conditions.

In accordance with the present invention the Cheng cycle is incorporated into the free turbine type of engine. A judicious amount of high enthalpy steam, which can be generated by the waste exhaust heat of a turbine, provides the highest practicable cycle efficiency if used in judicious quantities, as defined in U.S. Pat. No. 4,128,994, but compressor/turbine matching conditions must not be upset and the system must operate within the maximum rpm, surge line and turbine inlet temperature limits. This is accomplished by coupling a load to the compressor.

If an existing free turbine gas turbine system is to be retrofit, for example, to use the Cheng cycle to retain the objectives of high cycle efficiency without major redesign and modification of the basic turbine components, the retrofit cannot be accomplished simply by injecting steam into the combustion cans, as in the case of the single-shaft turbine. The basic difficulty, as already presented above, is attributable to the nature of the core turbine/compressor matching problem. If the steam corresponding to the critical amount required to produce peak efficiency in a single shaft Cheng cycle engine is injected into the combustion chamber of an unmodified free turbine engine, both the core turbine and the power turbine will produce increased power. The power output of the core turbine will increase far beyond what the compressor can absorb at the matched condition, since the power required for the compressor remains essentially constant and there is no convenient way to transfer the excess core turbine output from the core turbine to the power output turbine without a complicated mechanical system. The difficulty arises from the fact that the added power output of the core turbine is not needed by the compressor and cannot be easily transferred to the power output shaft.

DESCRIPTION OF THE DRAWINGS

FIG. 1 is a block schematic diagram of a single-shaft gas turbine.

FIG. 2 is a block schematic diagram of a free turbine type gas turbine.

FIG. 3 is a typical compressor performance map with matched operating path, for the gas turbine of FIG. 2.

FIG. 4 is a block-diagram representation of a typical control system and its feedback loop for the free turbine engine of FIG. 2.

FIG. 5 is a performance map which graphically illustrates the typical acceleration and deceleration process of the free turbine engine of FIG. 2.

FIG. 6 is a schematic block representation of another embodiment of the present invention utilizing a load coupled to the compressor, in the gas turbine engine of FIG. 2.

FIG. 7 is a block diagram of the control system of the embodiment of FIG. 6.

FIG. 8 is a performance map for a typical free turbine with steam injection comparing operations characteristics and regions with and without the present invention.

DETAILED DESCRIPTION OF THE INVENTION

A schematic diagram of a typical single shaft gas turbine 10 is show in FIG. 1. It consists of a compressor 12, a combustion chamber 14, and a turbine 16 which is linked rigidly to the compressor and coupled to the load by shaft 18. The turbine need not be matched at the operating point with the compressor; its excess power capability drives the load through the single shaft 18.

A typical free-turbine type of gas turbine 20 is shown in schematic form in FIG. 2. The turbine 20 consists of a compressor 12', a combustion chamber 14', a core or gas generator turbine 22 which is linked through a mechanical shaft or rotor 24 to the compressor 12', and a power or free turbine 26 which is connected to the load. The power turbine 26, which has no mechanical linkage to the core turbine 22 or compressor 12', is, nonetheless, linked thermodynamically to the engine system as a whole. The core turbine 22 produces essentially all the power required by the compressor 12'.

The power turbine 26 interfaces with the core turbine 22/compressor 12' combination through the mass flow and turbine inlet temperature in a peculiar way. At increased core turbine inlet temperature, the core turbine 22 produces more power so the compressor 12' is accelerated to a higher rpm, thus delivering more mass flow at a higher pressure ratio. Simultaneously, more mass flow through the power turbine 26 requires higher pressure ratio for its expansion through it. This reduces the pressure ratio of the working fluid across the core turbine 22, thus limiting its power output capability. This aero-thermodynamic feedback is tantamount to a non-mechanical coupling between the core and the power turbines.

The core turbine 22 and the compressor 12' must be matched in design to operate on or near a power-matched operating equilibrium path. A core turbine pressure ratio above the equilibrium operating path increases the rotational speed of the turbine 22. This higher speed causes the compressor 12' to generate greater pressure ratios. If additional air flow is restricted by the core turbine back pressure, the compressor 12' is forced to operate nearer to its surge region, where, because of flow separation on the compressor vanes, flow becomes unstable. Compressor 12' operation in the surge region is prohibited because of the severe transient loads imposed on the compressor blades when operating in this region.

FIG. 3 is a typical compressor map for free turbine engine 20. The compressor map is represented by a plot of pressure ratio vs. air flow, each parameter corrected by dimensionless variables. The corrected air flow rate is the air flow rate multiplied by the square root of $\theta$, the absolute temperature ratio between the ambient temperature and 520 degree R, and divided by the ambient pressure ratio $\delta$, normalized with normal atmospheric pressure at sea-level, 14.7 psia, as a reference point. The other operating parameters are the core turbine/ compressor constant rotational speed lines 32-57.5, again compensated by $\sqrt{\theta}$. High pressure ratio low-flow compressor operation is bounded by the compressor surge region, often called the surge line 82, although the condition where compressor surge occurs is not sufficiently precise to be defined as a line. Constant compressor efficiency contours are shown by dashed lines 71-77.

Compressor map 80 shows two segments of matched core-compressor operating line 86 connected at a certain designed rpm. The lower part 84 of the matched line corresponds to operating with an air-bleed valve open so that not all of the air pressurized the compressor 12' is expanded through the core turbine 22. This air-bleed operation facilitates startup of the engine and acceleration to its operating speed. The upper segment 87 of the matched line, where the air-bleed valve is closed, beginning at point 88, covers the power-producing range for the free turbine engine operation. This latter region is usually the region of interest for producing engine power. Peak rpm of core turbine 22/compressor 12' occurs at point 89. Turbine rpm is usually referenced to this rpm as 100% rpm.

FIG. 4 shows a typical control system 90 for free turbine engine 20. The essential element of the control system 90 is a load level control. Feedback signals 92 from the power turbine 26 are generated by sensing either rpm or torque and sent to the fuel control system 94, which regulates fuel flow 96 for the core turbine 22. Ordinarily, this is all that is required for a single-shaft gas turbine control. In the free turbine case, however, the two turbine rotational speeds are mechanically independent. This fact requires additional programmed control for the fuel flow rate. Since the core turbine 22 and the compressor 12' are matched, with a boundary of acceleration at the surge region on the compressor map, the control 94 also requires core rotor rpm or torque as a feedback signal 96. Such feedback can also be accomplished by measuring the compressor 12' pressure rise since it is ordinarily related to the rpm directly.

FIG. 5 illustrates the typical acceleration and deceleration process of a free turbine engine 20. Assume that the initial operating point is at $M_1$ on the equilibrium matched path 86, where the core turbine 22 power output matches the compressor 12' power requirement. Addition of more fuel increases the temperature of the working fluid, therefore increasing volume flow (and power potential) with the same amount of air mass flow. A higher pressure ratio is required to force the fluid, now occupying a larger volume, through the turbine 22. This causes the operating point to move along the constant rpm line 100 to point 1. This point represents a higher turbine output potential than the compressor needs at that rpm. That makes the core turbine rotor 24 accelerate to a new equilibrium position $M_2$ at a higher rpm. This process goes on until the engine core rotor 24 reaches either the maximum design rpm or the limiting design maximum turbine inlet temperature, at which point some form of control mechanism must limit further increase.

If point D represents the maximum design rpm point, a deceleration process occurs in a reverse fashion. When fuel is cut back, the temperature of the working fluid decreases. This decreases the volume flow for the same amount of air mass flow. Less pressure (ratio) is required for the working fluid to pass through the core turbine 22. Due to rotor 24 inertia, the operating point drops off temporarily to point $d_1$ along the constant rpm curve 102. This point is below the equilibrium matched operating line 86. The core turbine 22, therefore, cannot provide the power requirement of the compressor 12'. The operating condition therefore drifts towards a lower rpm operating point $d_2$ on the operating path 86 at a rate that depends on the power deficiency and the inertia of the rotating system.

FIG. 6 shows a free turbine 20' in accordance with the present invention. An output shaft 160 is added to the compressor 12'. A suitable coupling means 162, such as a clutch, selectively couples the output shaft 160 of the compressor 12' to a load. As explained, when steam is introduced prior to the core turbine 22, such as in the combustion chamber 14', the core turbine 22 produces more power than that required by the compressor 12'. By coupling a load to the compressor 12', this excess power is turned into useful work output. Additionally, it prevents a mismatch between the compressor 12' and the core turbine 22. As greater amounts of steam are injected within the combustion chamber 14', additional load is coupled to the compressor 12'.

The control system 100 for the free turbine 20' of FIG. 6 is illustrated in FIG. 7. Control system 100 senses the power turbine inlet temperature TIT by means of a suitable thermocouple temperature transmitter 102 which sends signals to the control system 100 via line 104. The load on and torque from free turbine 26 at output 1, along with the power turbine 26 rpm, N2, is sensed by governor 106 and is provided to the control system 100 via feedback line 108. In a similar manner output 2, provided by core turbine 22 through compressor 12' to avoid compressor/core turbine mismatch, is monitored to provide torque/load information via feedback line 110 to control system 100. Core turbine/compressor rpm, N1, is also provided via line 110 from governor 112.

Control system 100 regulates and controls the fuel flow rate from a suitable fuel source 114 to combustion chamber 14' through a fuel control line 116 which controls a fuel flow valve 118. Control system 100 also controls steam injection from a suitable steam source 120 into combustion chamber 14' through a steam control line 122 which controls a steam flow valve 124. A suitable steam source can, for example, be a heat exchanger or waste heat boiler such as utilized in Cheng cycle engines as described in U.S. Pat. Nos. 4,128,994 and 4,248,039, assigned to the assignee of the present invention. Also, by utilizing the teachings of these two patents, free turbine engine 20' can be run according to the Cheng cycle.

If steam source 120 is a waste heat boiler, steam control valve 124 advantageously is located between its evaporator and superheater. Such a steam control valve location is described in U.S. Pat. No. 4,393,649, assigned to the assignee of the present invention.

One configuration for control system 100 is described in U.S. Pat. Nos. 4,297,841 and 4,417,438, assigned to the assignee of the present invention. In the event that engine 20' is used in the Cheng cycle or used to produce process steam, this control mode is particularly suitable.

The engine operator provides load demand information for control system 100. Control system 100 provides a load control command signal via line 126 to the output 2 to provide appropriate loading as required to maintain system balance. A variety of load configurations can be used. For example output 2 can comprise a load coupled through a common gear box, including a clutch. If, as another example, engine 20' is used as a powerplant for a boat, load management at output 2 can comprise altering the pitch angle of the boat's propeller. The load can be a gas compressor for natural gas, in which case control valves regulate the volume of gas compressed depending upon the load. Also, regulation of output 2 depending upon the size of the load can comprise regulating the excitation current for the magnetic field of an electrical generator.

In operation, start-up of turbine 20' is the same as for the single shaft turbine 10. As the power turbine rpm, N2, increases, this information is fed back to the control 100 via line 108. The addition of steam at combustion chamber 14' further increases the power turbine 26 rpm, N2, and compressor rpm N1. Steam is also judiciously added so as not to exceed the designed rpm limit N1. At the same time additional load is added at output 2, thereby slowing down compressor 12'. This additional load is controlled in such a manner that fuel and steam flow rates are limited to maintain turbine inlet temperatures and the compressor surge margin within design limits.

Assuming power generation from the power turbine 26, engine 20' usually is run at a constant rpm and the power generation limitation is the surge line of the compressor 12'. If the power turbine load, output 2, is a variable rpm one, the control system 100 limits both rpm and surge margin of engine 20'. When such a limitation is reached, control system 100 determines the amount of steam flow allowed, so that neither the overspeed limit nor the pressure margin is exceeded.

FIG. 8 is a compressor map of a representative free turbine engine, the Allison 501 KF engine. With steam injection, the core turbine rpm, N1, of engine 20' increases, following the path a—a until the maximum rpm line 128 is reached. In comparison, path c—c is the path for a single shaft engine, such as the Allison 501 KB.

The operating line a—a limitation is overcome when engine 20' is operated in accordance with the present invention. By adding load to the compressor/core turbine when additional steam is injected, engine 20' can follow a constant rpm path b—b, limited only by the surge margin line 130. In fact engine 20' can be operated anywhere in the region bounded by the surge margin line 130, the maximum rpm limit line 128, and line a—a, the matched operating line for a standard steam injected engine.

The following Table I is a comparison of the performance of a steam-injected 501 KF engine, with and without the present invention, in comparison to a 501 engine without steam injection:

TABLE I

|  | Increased Horsepower | Increased Efficiency | Lbs/Sec of Steam |
| --- | --- | --- | --- |
| 501 KF Standard steam injection | 3.5% | 18% | 3.3 |
| 501 KF steam injection using present invention | 62% | 40% | 5.5 |
| Net Difference | 27% | 22% | 2.2 |

I claim:

1. In a free turbine type gas turbine comprising:
   compressor means;
   a core turbine mechanically coupled with said compressor means to power it;
   a power turbine which is independent from said core turbine; and
   a combustion chamber for providing a heated working fluid;
   means for adding steam to said working fluid;
   means for providing a single flow path for said working fluid, first through said core turbine and then through said power turbine; and
   wherein the improvement comprises:
   means for preventing mismatch between the core turbine and the compressor due to the addition of steam comprising coupling a variable output load to the compressor.

2. A gas turbine as in claim 1 wherein said steam adding means includes a waste heat boiler for generating steam.

3. A gas turbine as in claim 2 wherein said waste heat boiler additionally provides process steam.

4. A gas turbine as in claim 1 including means for utilizing the exhausted working fluid gases from said power turbine for steam generation by said steam adding means.

* * * * *